United States Patent [19]

Jorgensen

[11] 4,401,811

[45] Aug. 30, 1983

[54] PROCESS FOR THE PRODUCTION OF A CATION EXCHANGER: TREE BARK TREATED WITH ALKALI AND SULFURIC ACID FOR WASTE WATER TREATMENT

[76] Inventor: Sven E. Jorgensen, Langkaer Vaenge 9, DK-3500 Vaerløse, Denmark

[21] Appl. No.: 330,441

[22] Filed: Dec. 14, 1981

[30] Foreign Application Priority Data

Dec. 20, 1980 [DE] Fed. Rep. of Germany ....... 3048356

[51] Int. Cl.³ .......................... B01J 39/22; C02F 1/42
[52] U.S. Cl. ..................................... 536/59; 210/692; 210/905; 521/30; 536/122
[58] Field of Search .................. 536/59, 122; 210/692, 210/905; 521/30

[56] References Cited

U.S. PATENT DOCUMENTS 3,925,192 12/1975 Randall et al. ...................... 210/688
3,990,969 11/1976 Broddevall ......................... 210/917
4,260,740 4/1981 Carrington et al. .................. 521/30

FOREIGN PATENT DOCUMENTS 54778 6/1982 European Pat. Off. .
882398 9/1971 Canada .

*Primary Examiner*—A. Lionel Clingman
*Attorney, Agent, or Firm*—Watson, Cole, Grindle & Watson

[57] ABSTRACT

An inexpensive cation exchanger useful in purifying waste water is produced by treating comminuted bark in separate steps with an alkali hydroxide solution of at least 5% by weight, preferably 20-40% by weight, and with 30-75% by weight sulphuric acid, preferably 50-65% by weight. After each step washing with water is performed until the pH-value after the alkali hydroxide treatment goes below 9 and after the sulphuric acid treatment goes above 3. Preferably, the treatment with alkali hydroxide precedes the treatment with sulphuric acid. The treatment with alkali hydroxide is carried out for 0.5-20 hours, preferably 3-10 hours, and the treatment with sulphuric acid is carried out from 0.5-8 hours, preferably from 1-6 hours. The cation exchanger can be regenerated with alkali hydroxide solution, particularly sodium hydroxide solution.

17 Claims, No Drawings

PROCESS FOR THE PRODUCTION OF A CATION EXCHANGER: TREE BARK TREATED WITH ALKALI AND SULFURIC ACID FOR WASTE WATER TREATMENT

BACKGROUND OF THE INVENTION

The invention relates to a process for the production of a cation exchanger which is particularly suitable for the treatment of waste water.

The treatment of municipal and industrial waste water is becoming an increasing problem, especially in industrialized countries. A major problem is encountered when the waste water contains refractory components, i.e., components that cannot be biologically decomposed. It is therefore technologically important to develop processes which give a high efficiency at relative low cost for the treatment of waste water which besides protein and heavy metals contains refractory components. Proteins can be treated on biological units, but often these materials are so valuable that it would be natural to consider a recovery process.

Proteins, polypeptides and amino acids can be removed by chemical precipitation. As precipitants are used lignin sulphuric acid and dodecylbenzene sulphonic acid, and others.

However, only very high molecular weight proteins are precipitated, and compounds such as proteins which medium and lower molecular weight, polypeptides and amino acids are not removed by this process.

It would therefore be desirable to have an ion exchanger available which can remove such compounds and can therefore be used for treatment of waste water, which has been subjected to the precipitation treatment. Examples of waste water for which such a combined treatment may be advantageous is such from fish filletting factories, dairies, slaughterhouse and other food processing plants. This removal is furthermore of interest for recirculation of water in fish farms.

A number of cellulose ion exchangers are already on the market. Examples are cellulose sulphate esters produced by reacting cellulose with $SO_3$, and also cellulose phosphate esters. These are capable of solving the above-mentioned problem, but all these ion exchangers are prohibitively expensive.

SUMMARY OF THE INVENTION

It is an object of the invention to solve this problem by providing an ion exchanger moderate in cost and with high efficiency for general use in the treatment of waste water.

An important feature of the invention is that the raw material is bark. This is a material which has practically no industrial utility and can in fact be considered as a waste material from the wood industry. According to the invention, a cation exchanger, especially for the treatment of waste water, is produced by treating comminuted bark in separate steps with an alkali hydroxide solution of at least 5% by weight, and with sulphuric acid of between 30 and 75% by weight, and washing with water after each step. Preferably the treatment with alkali hydroxide solution precedes the treatment with sulphuric acid.

A cation exchanger produced in accordance with this process is capable of removing with a high efficiency not only proteins but also nitrogen-containing compounds, polypeptides and amino acids. Furthermore, it is also capable of removing a number of heavy metals, probably due to the formation of a complex bond between aromatic compounds in the ion exchanger and the heavy metals.

In the treatment of the comminuted bark with alkali hydroxide and sulphuric acid in the respective steps it will suffice, particularly in the case of relatively small batches, to let the bark stand in the respective reactants, and in that case a quantity of alkali hydroxide solution, or sulphuric acid, respectively, should be used which is sufficient to cover the bark completely. In the case of larger batches it will, however, be advantageous to stir the bark with the reactant in at least one of the two steps.

The reaction can take place at ambient temperature in both steps. However, in order to accelerate the reaction, the reaction mixture may also be heated, e.g., to a temperature between ambient temperature and 90° C. when working at atmospheric pressure. The possibility also exists to work in closed receptacles at pressures above that of the atmospheric and at higher temperatures.

The times of treatment depend on the reaction conditions. The longest period of treatment will be required if the bark is left to stand in the reactant without stirring. Usually the reaction time with sodium hydroxide will be between 0.5 and 20 hours, preferably between 3 and 10 hours, and with sulphuric acid between 0.5 and 8 hours, preferably between 1 and 6 hours.

In the washing step following each reaction step it is not necessary to go as far as to remove the alkali hydroxide and the sulphuric acid completely. In the washing step following the treatment with alkali hydroxide solution it suffices to wash down to a pH-value of 9 or below. In the washing step following the treatment with sulphuric acid it is preferable to wash up to a pH-value above 3, preferably above 4.

If the concentration of sulphuric acid is increased, a substantial part of the cellulose attached to the bark component will go into solution. As cellulose sulphate esters give a high ion exchange capacity, it is preferable to use a concentration of sulphuric acid between, as mentioned, 30 and 75% by weight. The best concentration is around 50% by weight, and with this concentration a one-hour reaction time or more is required, depending on the type of bark used in the process.

The preferred range of concentration of the alkali hydroxide solution is 20–40% by weight. For reasons of economy it is preferred to use sodium hydroxide solution for the first reaction step. The bark used as a starting material is preferably bark from coniferous trees, particularly spruce or pine, the highest preference being given to pine. Such bark has been found to give the highest ion exchange capacity, and as previously mentioned it is usually inexpensive and easy to obtain as a waste material from the wood industry.

The particle size of the bark is important for the use of the ion exchanger. Too small particle sizes may result in clogging of the ion exchanger column so that pressure loss through the column will be too high, while too great particle sizes have a too small accessible surface area. In the process according to the invention it is therefore preferred to comminute the bark to a particle size of an average diameter of 0.5–5 mm, preferably 1–3 mm.

The cation exchanger produced according to the invention can be regenerated by treatment with alkali hydroxide solution, particularly sodium hydroxide solution, and can thereby be re-used, thereby to improve the economy of the treatment of waste water. By elution of the used ion exchanger with 0.5 M sodium hydroxide the proteins are eluted. When heavy metals are to be recovered, the ion exchanger must be eluted with 0.5 M sulphuric acid.

By using three bed volumes of 0.5 M sodium hydroxide for the elution 96% of the proteins taken up by the ion exchanger will be recovered. if the same volume of 1 M sodium hydroxide is used, an almost 100% recovery of proteins will take place. Even if only two bed volumes of 0.5 M sodium hydroxide are used, 92% recovery of the proteins will still take place.

The ion exchange capacity can be explained roughly as follows: 25% is ascribable to acidic sulphate ester groups, mainly connected with cellulose. The remaining 75% is ascribable to carboxyl groups and hydroxyl groups, mainly bound to an aromatic compound, such as lignin compounds.

The ion exchanger produced according to the invention is capable of removing with a high selectivity all heavy metals, such as $Cu^{2+}$, $Cr^{3+}$, $Ni^{2+}$, $Cd^{2+}$, $Ag^{2+}$, $Sn^{2+}$, $Hg^+$ and $Hg^{2+}$. The selectivity corresponds to 50–75% of the total capacity and is ascribable to the carboxyl groups or hydroxyl groups.

The efficiency of the ion exchanger to take up amino acids, polypeptides and proteins, which have different isoelectric points, depends on the pH-value so that it may be advantageous, depending on the origin of the waste water, to readjust the pH-value depending on the isoelectric point of the proteins predominantly occurring in the waste water. Also the speed with which the proteins are taken up depends on the pH-value.

EXAMPLE 1

Pine bark was comminuted by means of a cutting machine to a particle size of 0.5–3 mm. The comminuted bark was placed in a vessel and covered with a 15% sodium hydroxide solution for seven hours. After removal of the sodium hydroxide the bark was washed with water until the pH-value was 9 or below. Thereafter the bark was covered in the same vessel or another with 65% sulphuric acid for four hours. The bark was then washed until the pH-value was 4 or above.

The ion exchanger produced in this manner was tested for treatment of waste water containing copper (from the electro-technical industry). 40 g ion exchanger material was placed in a glass column with a diameter of 2 cm. The volume of the ion exchanger was thus approximately 150 ml. The pH-value of the copper containing waste water was 5.2. The rate of flow was approximately 1–1¼ l per hour.

In the first 15 l of the outlet from the ion exchanger column the concentration of the copper ions was 0.1 mg/l or below. In the next 15 l the concentration increased to approximately 0.2 mg/l. The following 15 l up to a total of 45 l had a concentration of 1 mg/l. At a total of 60 l the process was interrupted, and the combined sample from all 60 l was analysed. The results are shown in the below table 1.

TABLE 1

| $Cu^{2+}$ analysis for waste water before and after treatment on bark cation exchanger | | |
|---|---|---|
| | Before treatment | After treatment |
| $Cu^{2+}$ (mg/l) | 12 | .42 |
| $KMnO_4$-number (mg/l) | 186 | 114 |

TABLE 1-continued

| $Cu^{2+}$ analysis for waste water before and after treatment on bark cation exchanger | | |
|---|---|---|
| | Before treatment | After treatment |
| Suspended matter (mg/l) | 960 | 875 |
| Ignition residue (mg/l) | 720 | 680 |

The capacity of the ion exchanger was 652 mg or 0.51 milliequivalents per gram, which corresponds to the ionic groups with high selectivity for removal of heavy metals. This again is approximately 60% of the total ion exchange capacity.

The ion exchanger was eluted with 2 volumes 1 M sulphuric acid. 96% of the copper taken up by the ion exchanger was recovered by this process.

EXAMPLE 2

In another test with the same ion exchanger waste water from a slaughterhouse was treated.

The pH-value of the crude waste water was adjusted to 4.6 and a substantial part of the nitrogen compounds was removed by precipitation. The waste water was then filtered and thereafter subjected to treatment in the ion exchanger.

100 g of the ion exchanger (300 ml under most conditions) were filled in a glass column up to a height of 42 cm. A flow rate of 20 ml/min and $cm^2$ was applied.

After 5.2 l had passed the ion exchanger column the material was eluted with 1 M sodium hydroxide. When using a volume of sodium hydroxide corresponding to twice that of the ion exchanger 96% of the proteins taken up by the ion exchanger was eluted.

The results of an analysis of the total flow quantity of 5.2 l are shown in Table 2.

TABLE 2

| Protein analysis of slaughterhouse waste water before and after treatment | | | |
|---|---|---|---|
| | After protein precipitation | After filtering (pH = 4.6) | After ion exchanger |
| Protein concentration (g/l) | 2.62 | 1.29 | .21 |
| $KMnO_4$-number (g/l) | 3400 | 1900 | 650 |

I claim:

1. A process for the production of a cation exchanger useful for the treatment of waste water, said process comprising the steps of:
   providing a batch of comminuted bark,
   separately treating said batch of comminuted bark with an alkali hydroxide solution of at least 5% by weight alkali hydroxide and sulfuric acid of between 30 and 75% by weight, and
   washing said comminuted bark with water after each said separate treating step.

2. The process as defined in claim 1, wherein sufficient amounts of alkali hydroxide solution and sulfuric acid are used in each said separate treating step to cover said batch of comminuted bark.

3. The process as defined in claim 1 wherein said comminuted bark is treated with alkali hydroxide solution for a total time of 0.5 to 20 hours.

4. The process as defined in claim 3 wherein said comminuted bark is treated with alkali hydroxide solution for a total time of 3 to 10 hours.

5. The process as defined in claim 3 wherein said comminuted bark is treated with sulfuric acid for a total time of 0.5 to 8 hours.

6. The process as defined in claim 3 wherein said comminuted bark is treated with sulfuric acid for a total time of 1 to 6 hours.

7. The process as defined in claim 3 wherein each washing of the comminuted bark after each treating step with alkali hydroxide solution is conducted until its pH-value drops to 9 or below.

8. The process as defined in claim 3 wherein each washing of the comminuted bark after each treating step with sulfuric acid is conducted until its pH-value increases to above 3.

9. The process as defined in claim 8 wherein each washing of the comminuted bark after each treating step with sulfuric acid is conducted until its pH-value increases to above 4.

10. The process as defined in claim 3 wherein said alkali hydroxide solution is a sodium hydroxide solution.

11. The process as defined in claim 10 wherein said sodium hydroxide solution contains sodium hydroxide in a concentration of 20 to 40% by weight.

12. The process as defined in claim 3 wherein said sulfuric acid has a concentration of 40 to 70% by weight.

13. The process as defined in claim 12 wherein said sulfuric acid has a concentration of 50 to 65% by weight.

14. The process as defined in claim 3 wherein said comminuted bark comprises comminuted pine.

15. The process as defined in claim 3 wherein said comminuted bark has a particle size of 0.5 to 5 mm.

16. The process as defined in claim 15 wherein said comminuted bark has a particle size of 1 to 3 mm.

17. A method of purifying waste water containing contaminants selected from the group consisting of amino acids, polypeptides and proteins, said method comprising
 providing a cation exchanger composed of comminuted bark which has been separately treated with an alkali hydroxide solution of at least 5% by weight alkali hydroxide and sulfuric acid of between 30 and 75% by weight, the comminuted bark being washed with water between each said separated treating step, and
 passing the waste water through said cation exchanger, the effluent emerging from said cation exchanger being purified.

* * * * *